United States Patent [19]

Burke

[11] Patent Number: 5,080,950
[45] Date of Patent: Jan. 14, 1992

[54] COMPOSITE FOAM STRUCTURAL LAMINATE

[75] Inventor: Donald D. Burke, Kansas City, Mo.

[73] Assignee: The Roll-o-Matic Chain Company, Kansas City, Mo.

[21] Appl. No.: 185,912

[22] Filed: Apr. 25, 1988

Related U.S. Application Data

[63] Continuation of Ser. No. 880,695, Jul. 1, 1986, Pat. No. 4,758,299.

[51] Int. Cl.⁵ .......................... B32B 3/26; B32B 7/04
[52] U.S. Cl. .................................. 428/81; 428/83; 428/157; 428/192; 428/316.6; 428/317.1
[58] Field of Search .................. 428/81, 83, 157, 192, 428/316.6, 317.1

[56] References Cited

U.S. PATENT DOCUMENTS

| | | | |
|---|---|---|---|
| 2,907,383 | 10/1959 | Kloote et al. | 428/316.6 |
| 2,999,041 | 9/1961 | Lappala | 428/316.6 |
| 3,003,810 | 10/1961 | Kloote et al. | 428/159 |
| 3,355,535 | 11/1967 | Hain et al. | 428/316.6 |
| 4,557,970 | 12/1985 | Holtrop et al. | 428/316.6 |

FOREIGN PATENT DOCUMENTS

| | | | |
|---|---|---|---|
| 1362035 | 4/1964 | France | 428/304.4 |
| 1128611 | 9/1968 | United Kingdom | 428/316.6 |

*Primary Examiner*—William J. Van Balen
*Attorney, Agent, or Firm*—Kokjer, Kircher, Bowman & Johnson

[57] ABSTRACT

A laminated structural panel which is especially well suited for the construction of a bulkhead used to partition a trailer or other cargo container. The center of the panel is formed by a polyurethane foam core panel sandwiched between a pair of flexible plastic reinforcing sheets adhesively bonded to opposite sides of the core panel. Additional layers of foam are adhesively bonded to the reinforcing sheets, and the outer foam layers are covered by puncture and abrasion resistant skins which are adhesively bonded to the foam. The reinforcing sheets provide the structural foam with tensile strength and with both beam and column strength because of their ability to resist being stretched. The outer foam layers provide impact resistance and enhanced strength due to the effect of the added laminations.

7 Claims, 1 Drawing Sheet

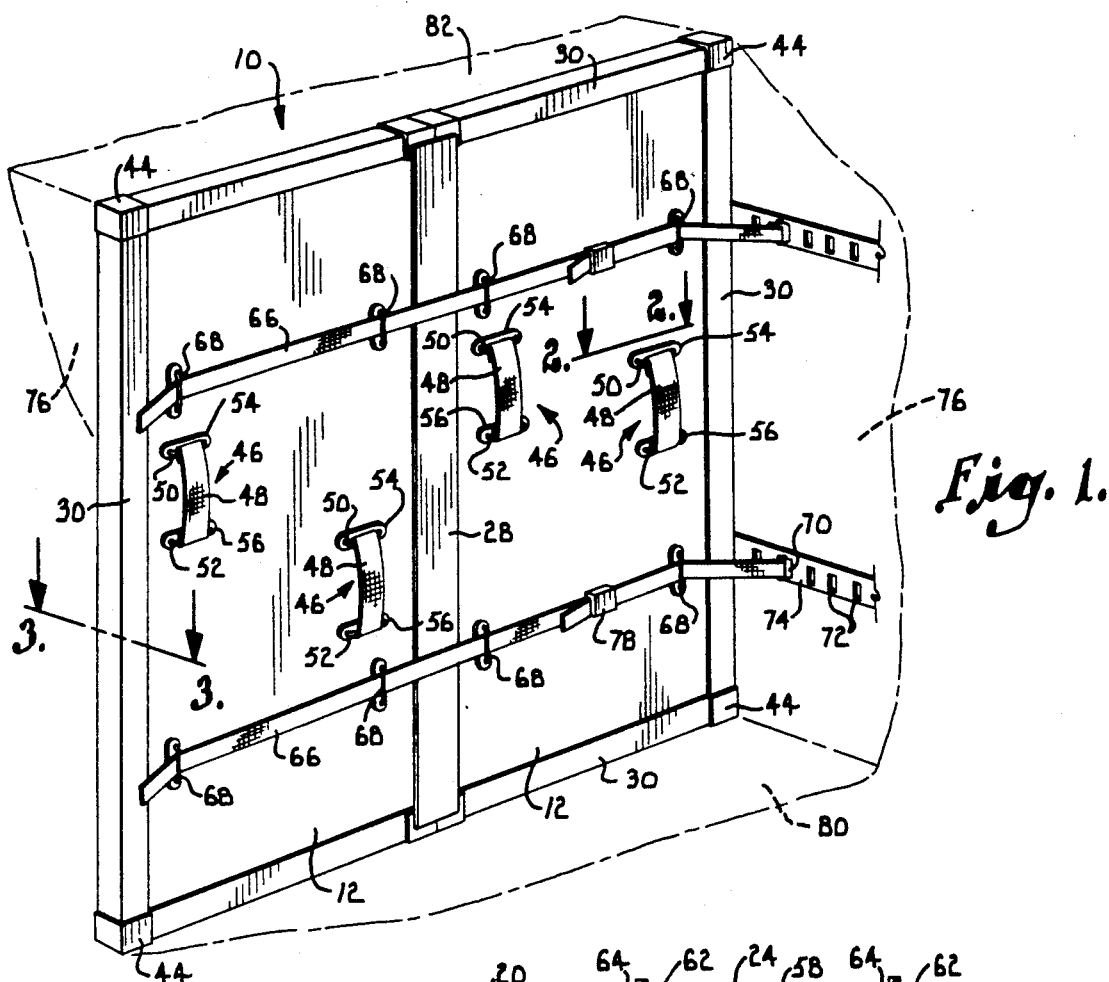
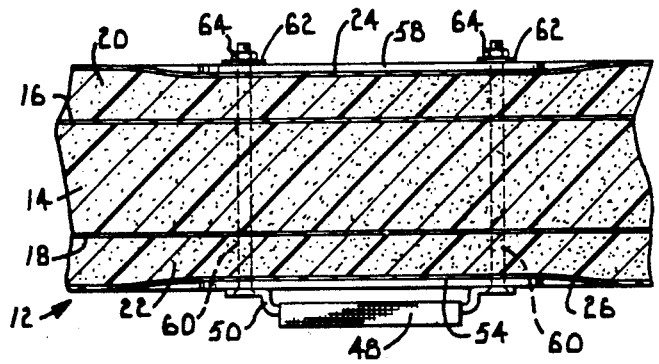
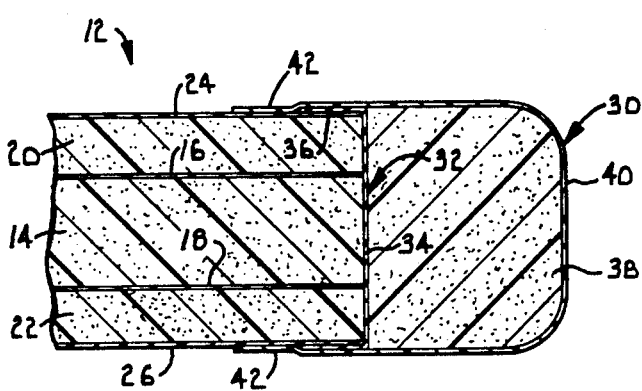

COMPOSITE FOAM STRUCTURAL LAMINATE

This is a continuation of application Ser. No. 880,695, filed July 1, 1986 now U.S. Pat. No. 4,758,299.

BACKGROUND AND SUMMARY OF THE INVENTION

This invention relates in general to laminated structural panels and more particularly to a laminated foam panel which is especially well suited for use as a bulkhead to partition a cargo compartment in a trailer or other cargo container.

Large over the road trailers are often partitioned into two or more cargo compartments which at times must be maintained at different temperatures and/or different humidity levels. For example, if ordinary cargo is carried along with produce and frozen goods in the same trailer, the cargo compartment must be partitioned into one compartment which is maintained below freezing for the frozen goods, another compartment which is maintained above freezing but below the ambient temperature for the produce, and a third compartment which can be at ambient temperature and humidity. In other situations, the cargo compartment must be partitioned simply to keep different types of cargo separated.

Normally, the function of partitioning the cargo area is performed by adjustable bulkheads that are installed in the trailer and can be adjusted along its length. The bulkhead contains thermal insulation if it is to serve as a barrier in a refrigerated cargo compartment.

The bulkhead is typically constructed of insulating material which is held in a rigid metal frame and covered on both sides by sheet metal or sheets of fiberglass reinforced plastic. Although this type of bulkhead functions well for the most part, it is relatively expensive to manufacture and is also somewhat heavy because of the amount of rigid materials that are required for structural purposes. In addition, if excessive loads are applied to the bulkhead by shifting cargo or other forces, the frame can be permanently bent or the insulation can be broken or otherwise damaged and this essentially destroys the bulkhead.

The present invention is directed to a laminated structural panel which is well suited for a variety of applications and particularly for service as a bulkhead which acts as a load restraint in a cargo compartment. The invention deals additionally with a method by which the laminations of the panel are attached and assembled.

In accordance with the invention, resilient structural foam such as open cell polyurethane foam is used to provide a core panel. Flexible plastic sheets are adhesively bonded to opposite sides of the core panel in order to reinforce and enhance the structural properties of the foam. One or more additional layers of foam are adhesively bonded to both sides of the core laminate, and the outer foam layers perform several functions. They enhance the already substantial beam and column strength of the panel and also protect the central core from damage due to impacts caused by shifting cargo or other externally applied forces. The opposite sides of the panel are covered by puncture and abrasion resistance skins which are adhesively bonded to the outer layers of foam.

The laminated panel exhibits good beam strength primarily because the reinforcing sheets are strong in tension and at least one of them must be stretched before the panel can deflect as a result of loads supplied perpendicular to its surface. For the same reason, buckling of the panel due to column loading is resisted primarily by the reinforcing sheets. The multiple layers of foam provide thermal insulation and sound dampening, and their resilience causes the panel to revert to its original flat shape rather than to permanently fail after it has been deflected due to application of a load. The reinforcing sheets and skins spread applied forces over relatively large areas and provide dimensional stability to the panel as well as acting as vapor barriers.

The characteristics of the laminated panel make it particularly useful for service as an adjustable bulkhead for partitioning the cargo area of a trailer compartment or other cargo compartment. The beam strength of the panel, the resistance to puncture and abrasion provided by the outer skins, and the impact protection provided by the multiple layers of foam all contribute to the ability of the panel to stand up under the loads that are applied by typical cargos carried in trailers. The resilience of the foam and the column strength of the panel are effective to maintain the bulkhead sealed continuously around its perimeter, and the thermal insulating characteristics of the foam make it resistant to heat transfer and thus well suited for use in refrigerated trailers.

DETAILED DESCRIPTION OF THE INVENTION

In the accompanying drawing which forms a part of the specification and is to be read in conjunction therewith and in which like reference numerals are used to indicate like parts in the various views:

FIG. 1 is a perspective view of a bulkhead formed by a pair of laminated panels constructed according to a preferred embodiment of the present invention and showing the bulkhead acting as a partition in a cargo compartment of a trailer which is shown only fragmentarily;

FIG. 2 is a fragmentary sectional view on an enlarged scale taken generally along line 2—2 of FIG. 1 in the direction of the arrows; and FIG. 3 is a fragmentary sectional view on and enlarged scale taken generally along line 3—3 of FIG. 1 in the direction of the arrows.

Referring now to the drawing in more detail, a bulkhead which is generally designated by numeral 10 may incorporate one or more laminated structural panels 12 which are constructed in accordance with the present invention. As best shown in FIGS. 2 and 3, each laminated panel 12 includes a resilient foam core panel 14 which is constructed of a foam rubber material. Preferably, the core panel 14 is constructed of an open cell polyurethane foam, although other resilient foams such as rubber, vinyl, and polyethylene foams, both open and closed cell, can be used, depending upon the application to which the panel is to be put. Although the density and compression rating of the core panel 14 can vary, it has been found that a density in the range of approximately 1 pound per cubic foot to 3 pounds per cubic foot and a compression rating in the range of approximately 30 pounds per square foot per inch of deflection to 150 pounds per square foot per inch of deflection provide the core panel with desirable strength and weight properties for most applications. Accordingly, it is preferred that the core panel have a density and compression rating in the aforementioned ranges.

The core panel 14 is rectangular and is cut to the length and width dimensions required for the panel 12.

The thickness of panel 14 can vary, although it has been found that a thickness of approximately 1½ inches is suitable when the panel is to serve as an insulating bulkhead.

The core panel 14 has flat opposite sides to which flexible reinforcing sheets 16 and 18 are adhesively bonded such that panel 14 is sandwiched between sheets 16 and 18. Each sheet 16 and 18 is rectangular and has the same length and width dimensions as the core panel 14. A good quality, high strength glue is used to adhesively bond the entire inside surface of each sheet 16 and 18 to the adjacent surface of the core panel 14.

The reinforcing sheets 16 and 18 provide the core panel 14 with tensile strength which is lacking in the polyurethane foam by itself. Sheets 16 and 18 provide good resistance against stretching, and this enhances the beam and column strength of the panel. Although a wide variety of materials function in a satisfactory manner, sheets 16 and 18 are preferably formed of copolyester plastic resin extruded into sheet form and having a tensile yield strength of approximately 2000 PSI or greater. Each sheet 16 and 18 is approximately 0.030 inch thick in the preferred embodiment, although the thickness can vary over a wide range. The tensile strength of each sheet 16 and 18 is considerably greater than that of the foam core panel 14 so that the reinforcing sheets provide tensile strength to the laminate. In addition, sheets 16 and 18 have a modulus of elasticity that is considerably less than that of the core panel 14. As a result, when the panel is deformed or displaced from its normal flat condition, the more resilient core panel 14 is able to return the entire structural panel to its normal, undeformed condition without significant interference from the reinforcement sheets 16 and 18.

In addition to copolyester resin sheets, a variety of film and sheet materials can serve as the reinforcing sheets 16 and 18. For example, cardboard sheets, polyethylene paper, high density polyethylene film as thin as 0.005 inch, glass fiber reinforced plastic, and MYLAR plastic sheets have been used with good results. Other sheet materials having a tensile strength greater than panel 14 and a modulus of elasticity less than that of the panel can also be used.

Additional foam layers in the form of open cell polyurethane foam panels 20 and 22 are adhesively bonded to the outside surfaces of the respective reinforcing sheets 16 and 18. Each reinforcing sheet is thus sandwiched between two foam panels and is bonded to each panel. Each panel 20 and 22 is rectangular and has the same length and width dimensions as the core panel 14. Preferably, the thickness of each panel 20 and 22 is the same and is less than the thickness of the core panel 14. By way of example, the outer panels 20 and 22 can be approximately one half as thick as the core panel.

The outer panels 20 and 22 protect the core panel 14 and the reinforcing sheets 16 and 18 from impacts caused by the application of forces to the composite panel 12. Panels 20 and 22 can be constructed of the same material (open cell polyurethane foam) as the core panel 14, although in some instances, it may be desirable to construct the outer panels 20 and 22 of a different foam rubber material.

In the preferred embodiment of the invention shown in FIGS. 2 and 3, a thin cover or skin 24 is adhesively bonded to the outside surface of panel 20 and a similar skin 26 is adhesively bonded to the outside surface of panel 22. The skins 24 and 26 provide protective covers for panel 12, and they are constructed of a flexible sheet material having good puncture resistance and abrasion resistance in order to prevent being punctured or abraded by the cargo or other objects applied to the panel. Preferably, each skin 24 and 26 is a polyester fabric coated with polyurethane, vinyl, or a blend of vinyl and polyurethane. A wide variety of other materials can be used to form the skins 24 and 26, including mylar fabric or another suitable fabric, synthetic or natural. The weight of the skin material should be at least 10 ounces per square yard of surface area. Again, a good quality, high-strength glue is used to adhesively bond the entire surface of each skin 24 and 26 to the corresponding surface of the adjacent panel 20 or 22. The skins 24 and 26 enhance the tensile strength of the panel and have a greater tensile strength and greater resistance to elongation than the foam panels 14, 20 and 22.

It is to be understood that additional foam layers similar to layers 20 and 22 can be added to the laminated panel 12, and each added foam panel is separated from the adjacent panel or panels by a reinforcing sheet similar to sheets 16 and 18. The skins 24 and 26 are applied to the two outermost foam layers regardless of the number of laminations. By increasing the number of foam layers and the number of reinforcing skins, the structural characteristics of the panel can be enhanced, although this benefit is in many cases offset by the added cost and the added number of manufacturing operations that are required. Even so, a panel which exhibits considerable beam and column strength can be formed by increasing the number of laminations and/or increasing the distance between each pair of reinforcing sheets and/or increasing the overall thickness of the panel 12.

Referring now particularly to FIG. 1, the bulkhead 10 is formed by connecting a pair of the panels 12 edge to edge by a hinge 28. The hinge 28 extends vertically along the center of the bulkhead 10 and provides a vertical hinge axis about which panels 12 can be pivoted relative to one another. This permits the panels 12 to be folded one upon the other when the bulkhead is not in service. When the bulkhead is installed in a cargo compartment, the hinge allows the panels 12 to assume the positions shown in FIG. 1 wherein they occupy a substantially common plane. The hinge 28 may be constructed in any suitable manner and forms no part of the present invention. It is to be understood that the bulkhead can be formed by a single laminated panel 12 or by virtually any number of panels connected together by hinges or otherwise.

The combined bulkhead panel formed by the two connected panels 12 has a rectangular periphery which is provided with a compressible seal generally designated by numeral 30 and effective to provide an air tight seal between the bulkhead and the trailer body in which the bulkhead is installed. As best shown in FIG. 3, each edge of each panel 12 is provided with an edge cover 32 having a flat web 34 which spans the exposed edges of panels 14, 20 and 22. The edge cover 32 has a pair of flanges 36 which extend from opposite edges of the web 34 and which overlie the outer edges of the skins 24 and 26. The flanges 36 are adhesively bonded or welded to the outside surfaces of the skins 24 and 26. The edge cover 32 can be formed from the same material as the skins 24 and 26.

A foam rubber strip 38 forms part of the compressive seal 30 and is preferably formed of polyurethane foam or a similar material which is capable of being compressed and of springing against the compression in order to maintain a seal. Strip 38 is contained within a seal cover 40 having flanges 42 which overlie flanges 36 and the adjacent portions of the skins 24 and 26. Flanges 42 are adhesively bonded to the outside surfaces of flanges 36 and skins 24 and 26, and the foam strip 38 is adhesively bonded or welded to the inside surface of the cover 40 and the outside surface of web 34.

It should be noted that rather than being adhesively bonded to the perimeter of the bulkhead 10, the seal 30 can be attached by means of mechanical fasteners or in any other suitable manner. For example, a rigid plastic extrusion can be applied to cover the edges of the foam layers and can be attached in an appropriate manner. A compressive seal can then be mounted on the extrusion and attached mechanically. It should also be understood that the seal 30 can be prefabricated and attached to the periphery of the bulkhead as a unit, as by welding or adhesively bonding flanges of the prefabricated seal to the edge portions of the skins.

As shown in FIG. 1, corner covers 44 are fitted on each corner of the bulkhead 10. The corner covers 44 may be constructed of the same material as the skins 24 and 26, and they may be adhesively bonded in place on the corners of the bulkhead.

Each panel 12 of the bulkhead is provided with a pair of handles which are generally designated by numeral 46. Each handle 46 includes a flexible strap 48 having its opposite ends looped and stitched to form a sleeve. The sleeve on the top end of each strap 48 is looped around an upper metal bracket 50, while the bottom sleeve is looped around a lower metal bracket 52 having the same construction as the upper bracket 50.

The upper and lower brackets 50 and 52 of each handle 46 are secured to respective upper and lower mounting plates 54 and 56 which are preferably rigid plastic plates with rounded corners. As best shown in FIG. 2, each of the upper plates 54 is adhesively bonded to the outside surface of skin 26 and is aligned with a corresponding plate 58 which is adhesively bonded to the outside surface of the opposite skin 24. A pair of elongated bolts 60 are extended through flanges on the opposite ends of bracket 50 and are also extended through both mounting plates 54 and 58 and through the entire thickness of panel 12. A washer 62 and nut 64 are applied to the free end of each bolt 60 in order to secure bracket 50 in place on its mounting plate 54. The bonding of the plates 54 and 58 to the opposite skins 26 and 24 eliminates any tendency for the mounting plates to abrade or otherwise wear against panel 12, and this manner of attachment of the handles 46 also prevents the bolt holes through panel 12 from tearing or otherwise becoming enlarged when the straps 48 are pulled. The straps provide hard grips by which the bulkhead panel can be handled.

Each of the lower plates 56 has a corresponding plate on the opposite side of panel 12, and each lower bracket 52 is attached in the same manner described in connection with the upper brackets 50.

Upper and lower straps 66 are used to secure the bulkhead 10 in position within the trailer. Each strap 66 is threaded through a plurality of eyes 68 which are preferably attached to the surface of the bulkhead 10 in the same manner as the brackets 50 and 52. Spring loaded clips 70 on the opposite ends of each strap 66 are fitted in sockets 72 which extend into metal tracks 74 mounted on the opposite side walls 76 of the trailer body. The clips are rigidly held in the sockets and can be released and withdrawn from the sockets by depressing a lever (not shown). Each strap 78 is provided with a buckle 78 which can be used to secure the strap in a tight condition in order to maintain the bulkhead 10 in position in a vertical orientation in extension between the two side walls 76 and between the floor 80 and ceiling 82 of the trailer body.

The laminated panel 12 is manufactured by first coating the inside surface of each skin 24 and 26 with adhesive and then pressing the panels 20 and 22 against the adhesively coated side of the corresponding skin. Preferably, the laminates thus formed by panel 20 and skin 24 and panel 22 and skin 26 are cured under pressure. Reinforcing sheet 16 is coated with adhesive on both sides, and one side of sheet 16 is applied to the inside surface of panel 20, preferably by stacking sheet 16 on top of the laminate formed by skin 24 and panel 20. The core panel 14 is then applied to the adhesive on the opposite side of sheet 16, again by stacking. Next, the other reinforcing sheet 18 is coated on both sides with adhesive, and one side of sheet 18 is applied to the exposed side of panel 14. Finally, the laminate formed by panel 22 and 26 is applied to the opposite side of sheet 18 with panel 22 in contact with the sheet. The resulting panel is then cured under pressure which may be applied by a press which presses the outer skins 24 and 26 toward one another to apply pressure to the entire panel during curing. Preferably, the foam layers and sheet material are maintained in horizontal orientations and are stacked on one another during manufacture of the panel.

After the panel 12 has completely cured, it is cut along the edges to the final size. The edge covers 34 are then applied and welded or bonded in place on the perimeter of the panel. Seal 30 is then welded or bonded in place, as is the hinge 28. Finally, the handles 46 and eyelets 68 are bolted in place on the appropriate side of the panel. It is noted that other hardware articles can be mounted on the panel if desired. In addition, openings can be cut through panel 12 at the desired locations to accommodate vents or fans (not shown).

The bulkhead is used by securing it in the position shown in FIG. 1, and it then serves as a partition or barrier which separates the cargo area of the trailer body into different compartments. The foam panels 14, 20 and 22 provide good thermal insulation which allows the different cargo compartments to be maintained at different temperature levels. Skins 24 and 26 and the reinforcing sheets 16 and 18 serve as vapor barriers which permit the different cargo areas to be maintained at different humidity levels.

The laminated construction of the bulkhead 10 allows it to withstand the loads that are applied by shifting cargo and other forces. The bulkhead exhibits good beam strength because loads which are applied to its opposite sides perpendicular to its face are effectively resisted. Before the panel can deflect due to beam loading, it is necessary for at least one of the reinforcing sheets 16 and 18 to be stretched into a curved shape, and the sheets 16 and 18 are highly resistive to elongation due to their high tensile yield strength. Consequently, the tensile strength of the sheets 16 and 18 resists deflection of the panel caused by the application of side loads. If the panel does deflect as a result of a side load, the resilience of panels 14, 20 and 22 return it to its original flat shape as soon as the load is removed. Thus, permanent deformation or damage does not result even if the panel is deflected significantly due to heavy loading applied to one of its sides.

The resilience of the foam panels 14, 20 and 22 also maintains the perimeter seal 30 in good sealing contact with the side wall 76 and the floor 80 and ceiling 82 of the trailer body, thus helping to secure the bulkhead in place and resisting leakage of air or moisture around the perimeter of the bulkhead because of the air tight seal on the perimeter of the bulkhead. Because buckling of the panel 12 due to column loading requires that one or both of the sheets 16 and 18 be stretched into a curved condition, the panel exhibits good column strength as well as good beam strength.

The skins 24 and 26 cooperate with the reinforcing sheets 16 and 18 to provide the composite panel with enhanced tensile strength. In addition, the skins act to help spread any forces that are applied over the surface of the bulkhead, thus helping to protect the interior components of the panel. Skins 24 and 26 are resistant to puncture and abrasion and thus protect the underlying foam components. The outer foam components 20 and 22 provide impact protection for the reinforcing sheets 16 and 18 and the core panel 14, and panels 20 and 22 also enhance the beam and column strength of the panel, as previously indicated.

The reinforcing sheets 16 and 18 provide the panel with dimensional stability, beam strength, and column strength, and they also act to spread the loads over a greater area. Sheets 16 and 18 also act as a barrier to any vapor which does manage to pass the sheets 24 and 26, and it also performs a puncture resisting function.

The core panel 14 connects and supports the two reinforcing sheets 16 and 18 and mechanically functions as though it were a combination tension and compression spring which is connected between sheets 16 and 18 at an infinite number of points. The outer layers 20 and 22 similarly function as resilient compression and tension springs connected between the skins and reinforcing sheets. The foam panels 14, 20 and 22 provide thermal and sound insulation and control the separation between sheet 16 and 18 and skins 24 and 26.

The structure formed by one layer of foam sandwiched between two layers of sheet material functions much like a classical box beam, and each lamination that is added to this box beam structure acts to more broadly distribute loads that are applied. The additional laminations also enhance the column strength of the panel.

In addition to service as a bulkhead, the laminated panel 12 has a wide variety of additional applications. Among these are service as a sound dampening partition, an impact absorbing interior for a vehicle cab, an impact absorbing seat or other structure within an aircraft, an insulated door, a frameless furniture article, a piece of gymnastic equipment, a foam mattress, a shipping container, a flack resistance structure, an insulated tank for granular and/or liquid materials, a baggage container, a modular freight container, a rollup door, an emergency shelter, and a shelter in low temperature environments. Among the features that can be controlled within a virtually infinite range are the insulation value of the panel, its column strength, its impact resistance, and its puncture resistance.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A bulkhead for partitioning a cargo compartment, comprising:
   a resilient foam core panel having a generally rectangular shape sandwiched between a pair of resilient layers of foam each having a generally rectangular shape, said core panel and foam layers having sufficient thickness to exhibit self support dimensional stability and structural integrity;
   a pair of flexible reinforcing sheets sandwiched between the core panel and the respective layers of foam, each sheet being adhesively bonded to the core panel and the adjacent layer of foam by adhesive applied to substantially the entirety of each surface of each sheet and each sheet having a modulus of elasticity less than that of the core panel and foam layers and a tensile strength greater than that of the core panel and foam layers, each reinforcing sheet being constructed from sheet material having a normally flat condition;
   a thin skin adhesively bonded to each layer of foam to sandwich the layer between the skin and reinforcing sheet, each skin being resistant to puncture forces applied by the cargo;
   said core panel, sheets, foam layers and skins being bonded together to form a laminated bulkhead panel having a substantially rectangular periphery and a normally flat shape, said bulkhead panel making use of the mechanical strength of the reinforcing sheets to resist deflection resulting from lateral applied loads and to recover strength when the bulkhead panel resumes the normally flat shape subsequent to the deflection; and
   a compressible seal on said periphery for effecting a seal between the bulkhead panel and cargo compartment.

2. The bulkhead of claim 1, including:
   a pair of rigid plastic mounting plates adhesively bonded to an outer surface of each skin, the plates in each pair being spaced apart from one another and being substantially aligned with corresponding plates in the other pair on opposite sides of the bulkhead panel;
   at least one elongate rigid fastener extending through the laminated bulkhead panel between each pair of aligned mounting plates and acting to connect the aligned plates; and
   a handle member extending between and connected to the mounting plates on one side of the bulkhead panel.

3. The bulkhead of claim 1, wherein:
   said core panel and foam layers comprise foam materials which exhibit good thermal insulation properties; and
   said compressible seal provides a substantially air tight seal between the bulkhead panel and cargo compartment.

4. The bulkhead of claim 1, wherein said core panel and foam layers comprise polyurethane foam having a density in the range of approximately 1-3 pounds per cubic foot and a compression rating in the range of approximately 30–150 pounds per square foot per inch of compressive deflection.

5. The bulkhead of claim 4, wherein each reinforcement sheet comprises a flexible plastic sheet having a tensile yield strength of at least approximately 2000 psi.

6. The bulkhead of claim 5, wherein each skin comprises a flexible polyester fabric coated with polyurethane and/or vinyl and having a weight of at least approximately 10 ounces per square yard of surface.

7. A bulkhead for partitioning a cargo compartment, comprising:
- a resilient foam core panel having a generally rectangular shape sandwiched between a pair of resilient layers of foam each having a generally rectangular shape, said core panel and foam layers having sufficient thickness to exhibit self supporting dimensional stability and structural integrity;
- a pair of flexible reinforcing sheets sandwiched between the core panel and the respective layers of foam, each sheet being adhesively bonded to the core panel and the adjacent layer of foam by adhesive applied to substantially the entirety of each surface of each sheet and each sheet having a modulus of elasticity less than that of the core panel and foam layers and a tensile strength greater than that of the core panel and foam layers, each reinforcing sheet being constructed from sheet material having a normally flat condition;
- a protective skin covering said layers of foam, said skin being resistant to puncture forces applied by the cargo;
- said core panel, sheets and foam layers being bonded together to form a laminated panel covered by said skin and having a substantially rectangular periphery and a normally flat shape, said panel making use of the mechanical strength of the reinforcing sheets to resist deflection resulting from laterally applied loads and to recover strength when the bulkhead panel resumes the normally flat shape subsequent to the deflection;
- a pair of rigid plastic mounting plates adhesively bonded to said skin on each side of the panel, the plates in each pair being spaced apart from one another and being substantially aligned with corresponding plates in the other pair on opposite sides of the panel;
- at least one elongate rigid fastener extending through the laminated panel between each pair of aligned mounting plates and acting to connect the aligned plates; and
- a handle member extending between and connected to the mounting plates on one side of the panel.

* * * * *